United States Patent
Okamoto et al.

(10) Patent No.: US 9,077,892 B2
(45) Date of Patent: Jul. 7, 2015

(54) IMAGING APPARATUS USING DIFFERENT FOCUS LENS DRIVING METHODS BETWEEN WHEN ZOOM MAGNIFICATION IS CHANGED AND WHEN NOT CHANGED

(71) Applicant: Panasonic Corporation, Osaka (JP)

(72) Inventors: Mitsuyoshi Okamoto, Osaka (JP); Koji Shibuno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 13/898,516

(22) Filed: May 21, 2013

(65) Prior Publication Data

US 2013/0300915 A1   Nov. 14, 2013

Related U.S. Application Data

(62) Division of application No. 12/606,594, filed on Oct. 27, 2009, now Pat. No. 8,525,916.

(30) Foreign Application Priority Data

Oct. 30, 2008   (JP) .................................. 2008-279431
Dec. 15, 2008   (JP) .................................. 2008-317945

(51) Int. Cl.
H04N 5/232   (2006.01)
G03B 13/00   (2006.01)
G02B 7/36   (2006.01)
(Continued)

(52) U.S. Cl.
CPC ....... *H04N 5/23212* (2013.01); *H04N 5/23209* (2013.01); *G02B 7/36* (2013.01); *G03B 13/36* (2013.01); *H04N 5/23219* (2013.01); *H04N 5/23248* (2013.01); *H04N 5/23296* (2013.01); *G03B 17/14* (2013.01)

(58) Field of Classification Search
CPC .......... H04N 5/23209; H04N 5/23212; H04N 5/23219; H04N 5/23296; H04N 5/23248
USPC .......................... 348/345, 352, 240.99, 240.3
See application file for complete search history.

(56) References Cited

U.S. PATENT DOCUMENTS

| 8,289,439 B2 | 10/2012 | Yasuda .......................... 348/349 |
| 2004/0052514 A1 | 3/2004 | Hirai |

(Continued)

FOREIGN PATENT DOCUMENTS

| EP | 1564988 | 8/2005 |
| JP | 2-93441 A | 4/1990 |

(Continued)

*Primary Examiner* — Antoinette Spinks
(74) *Attorney, Agent, or Firm* — Panasonic Patent Center (57) ABSTRACT

An imaging apparatus includes an optical system including a focus lens, an imaging unit operable to capture a subject image formed by the optical system to generate image data, a driver operable to drive the focus lens along an optical axis of the optical system, and an autofocus adjusting unit operable to adjust a subject image formed on the imaging unit to be in focus by evaluating the image data generated by the imaging unit and by controlling the driver to drive the focus lens. When adjusting the subject image to be in focus anew after previously adjusting the subject image to be in focus, the autofocus adjusting unit estimates a focus position and controls the driver to drive the focus lens according to a driving method used for evaluating the image data generated by the imaging unit, and different driving methods are used for different results of the estimation.

3 Claims, 8 Drawing Sheets

(51) Int. Cl.
G03B 13/36 (2006.01)
G03B 17/14 (2006.01)

(56) References Cited

U.S. PATENT DOCUMENTS

| | | | |
|---|---|---|---|
| 2004/0125229 A1 | 7/2004 | Aoyama et al. | 348/345 |
| 2005/0168620 A1 | 8/2005 | Shiraishi | |
| 2006/0140613 A1* | 6/2006 | Aikawa | 396/133 |
| 2006/0171699 A1 | 8/2006 | Nakai et al. | |
| 2007/0077046 A1 | 4/2007 | Lim | 396/52 |
| 2008/0031611 A1 | 2/2008 | Konishi | 396/102 |
| 2008/0036902 A1 | 2/2008 | Tanaka | 348/353 |
| 2008/0193115 A1 | 8/2008 | Uenishi | 396/123 |
| 2008/0193116 A1 | 8/2008 | Uenishi | 396/135 |
| 2008/0198257 A1 | 8/2008 | Morimoto | 348/345 |
| 2008/0240700 A1 | 10/2008 | Takagi | |
| 2008/0247741 A1 | 10/2008 | Yasuda | 396/104 |
| 2008/0310830 A1 | 12/2008 | Pan et al. | 396/52 |
| 2009/0009651 A1 | 1/2009 | Takayanagi | 348/345 |
| 2009/0059056 A1 | 3/2009 | Mizuguchi et al. | 348/340 |
| 2009/0256953 A1 | 10/2009 | Yasuda | 348/349 |

FOREIGN PATENT DOCUMENTS

| | | |
|---|---|---|
| JP | 4-366907 | 12/1992 |
| JP | 2004-102135 | 4/2004 |
| JP | 2005-202064 A | 7/2005 |
| JP | 2005-345833 A | 12/2005 |
| JP | 2006-171292 | 6/2006 |
| JP | 2006-259688 A | 9/2006 |
| JP | 2007-101907 A | 4/2007 |
| JP | 2008-052225 | 3/2008 |
| JP | 2008-242226 | 10/2008 |
| WO | 2006/080562 | 8/2006 |

* cited by examiner

IMAGING APPARATUS USING DIFFERENT FOCUS LENS DRIVING METHODS BETWEEN WHEN ZOOM MAGNIFICATION IS CHANGED AND WHEN NOT CHANGED

BACKGROUND

1. Technical Field

This technical field relates to an imaging apparatus having an autofocus adjusting function, and in particular, to an imaging apparatus capable of automatically controlling the focus position in a contrast method.

2. Related Art

JP 2-93441 A discloses an autofocusing device used to a camera having a zoom lens. This autofocusing device has a focus lock function, and when performing a focus operation it can maintain a state of a focus lens after an in-focus state is obtained. However, once a zoom operation is performed after the focus operation, the focus lens is often located at other than the focus position. Therefore, in a case where the zoom operation is performed after the focus operation the autofocusing device performs the focus operation again even if a focus lock is on. In this way, the autofocusing device can prevent an out-of-focus shooting even though the zoom operation is performed after the focus operation.

Although the autofocusing device disclosed in JP 2-93441 A is invented to enable the shooting operation while keeping the in-focus state, JP 2-93441 A fails to refer to speed-up of the focus operation.

SUMMARY

To solve the problem described above, an imaging apparatus is provided, which is capable of performing an autofocus control operation at high speed in a contrast method.

An imaging apparatus of a first aspect includes an optical system including a focus lens, an imaging unit operable to capture a subject image formed by the optical system to generate image data, a driver operable to drive the focus lens along an optical axis of the optical system, and an autofocus adjusting unit operable to adjust a subject image formed on the imaging unit to be in focus by evaluating the image data generated by the imaging unit and by controlling the driver to drive the focus lens. When adjusting the subject image to be in focus anew after previously adjusting the subject image to be in focus, the autofocus adjusting unit estimates a focus position and controls the driver to drive the focus lens according to a driving method used for evaluating the image data generated by the imaging unit, and different driving methods are used for different results of the estimation.

When adjusting the subject image to be in focus anew after previously adjusting the subject image to be in focus, the autofocus adjusting unit may detect whether or not the zoom magnification of the optical system is changed during a period from the previous focus operation to the new focus operation. In this case, the autofocus adjusting unit may control the driver to drive the focus lens in a driving method used for evaluating the image data generated by the imaging unit, and the different driving methods may be used between when the zoom magnification is changed and when the zoom magnification is not changed.

The imaging apparatus may further include a motion detector for detecting the motion of the imaging apparatus and/or the subject. The autofocus adjusting unit may control the driver to drive the focus lens in a driving method used for evaluating the image data generated by the imaging unit, the different driving methods may be used for different magnitudes of a motion detected by the motion detector.

According to the imaging apparatus, in the autofocus control operation, the autofocus operation by the contrast method can be performed at a high speed by driving a focus lens in different ways in accordance with the predicted change in focus position.

DETAILED DESCRIPTION OF THE PREFERRED EMBODIMENT

1. First Embodiment

1-1 Overview

Figure 1:
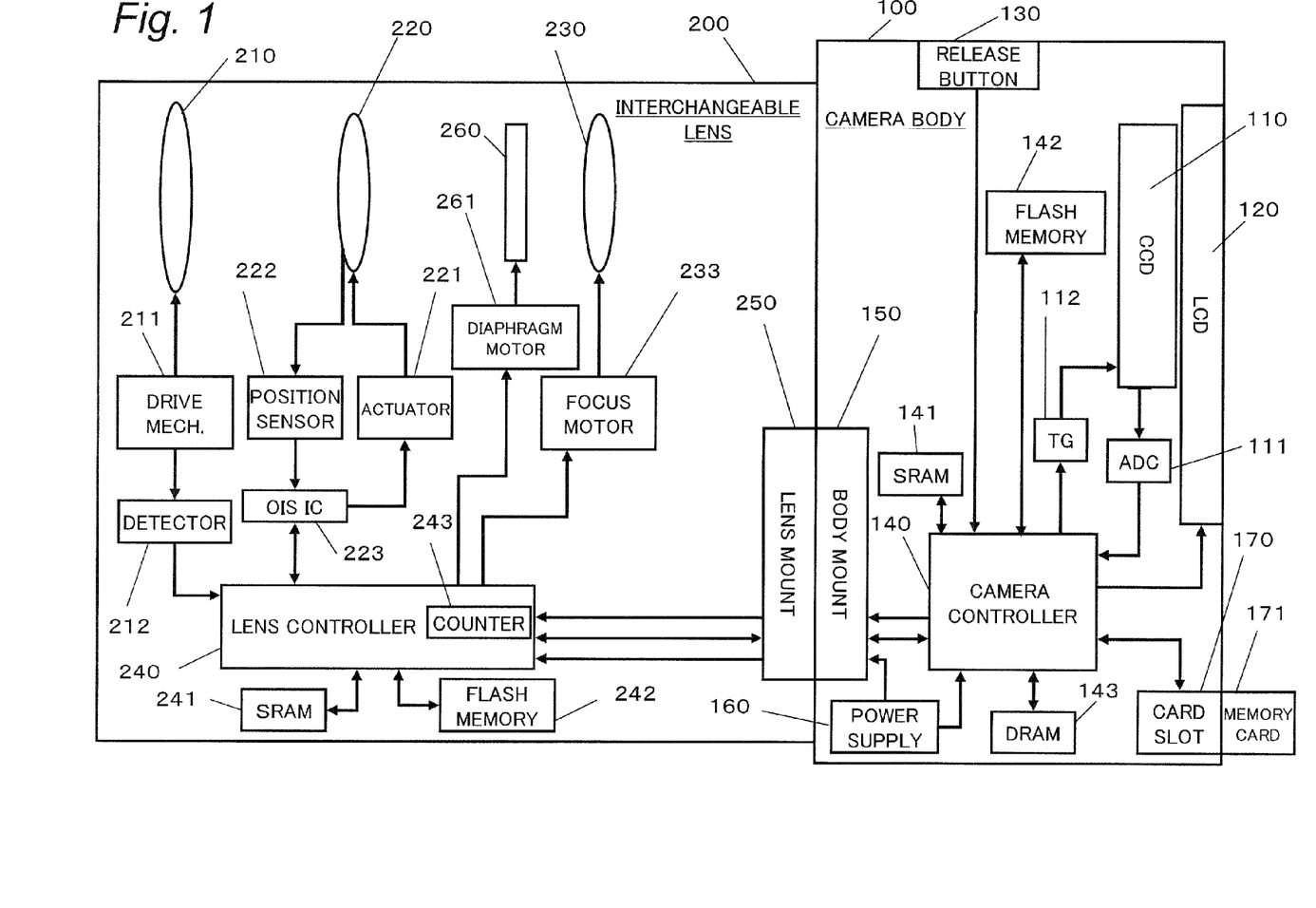
FIG. 1 is a diagram showing a configuration of a camera system.

FIG. 1 shows a configuration of the camera system according to this embodiment. The camera system 1 includes a camera body 100 and an interchangeable lens 200. The camera system 1 can perform autofocus control by detecting an AF evaluation value (contrast value) (evaluation value used for autofocus operation) of an image represented by image data captured by a CCD image sensor 110 included in the camera body 100.

The camera system according to the embodiment has a purpose to speed up autofocus operation in an autofocus adjusting device included in the camera system which can perform autofocus control in a contrast method.

1-2 Configuration

1-2-1 Configuration of Camera Body

The camera body 100 includes a CCD image sensor 110, a liquid crystal display (LCD) monitor 120, a camera controller 140, a body mount 150, a power supply 160, and a card slot 170.

The camera controller 140 controls operations of the respective units including the CCD image sensor 110 to control the operation of the entire camera system 1 in response to a command from an operational member such as a release button 130. The camera controller 140 sends a vertical synchronizing signal to a timing generator 112. A DRAM 143 is used as a work memory for control and image processing operations performed by the camera controller 140. A flash memory 142 stores programs and parameters used for the control operation of the camera controller 140.

The CCD image sensor 110 generates an image signal from an optical signal containing a subject image incident through the interchangeable lens 200. The generated image signal is converted into a digital signal or image data by an A/D converter 111. The image data generated by the A/D converter 111 is subjected to various image processing by the camera controller 140. The various image processing includes, for example, a gamma correction process, a white balance correction process, a defect correction process, a YC conversion process, an electronic zoom process, and an image compression process such as a JPEG compression process.

The CCD image sensor 110 operates at a timing controlled by the timing generator 112. The operations of the CCD image sensor 110 include an operation of capturing a still image, an operation of capturing a moving image, and an operation of capturing a through image. The through image is displayed on the LCD monitor 120 in real time after being captured by the CCD image sensor, but is not recorded in a memory card 171. The through image is mainly a moving image, and is displayed on the LCD monitor 120 to allow a user to determine a composition at the time of capturing a still image.

The LCD monitor 120 displays an image indicated by a display image data processed by the camera controller 140. The LCD monitor 120 can selectively display a moving image and a still image.

The card slot 170 can be loaded with the memory card 171 and writes/reads data to/from the memory card 171 under the control of the camera controller 140. The memory card 171 can store image data generated by the image processing operation of the camera controller 140. For example, the memory card 171 can store a JPEG image file. Also, the image data or the image file stored in the memory card 171 can be read from the memory card 171. The image data or the image file read from the memory card 171 is subjected to the image processing by the camera controller 140. For example, the camera controller 140 decompresses the image data or the image file obtained from the memory card 171 to generate the display image data.

The power supply 160 supplies electric power to be consumed by the camera system 1. The power supply 160 may be, for example, a dry cell or a rechargeable battery. Alternatively, the power supply 160 may be configured so that the power supplied from an external source may be supplied to the camera system 1 through a power cord.

The body mount 150 can be connected mechanically and electrically to a lens mount 250 of the interchangeable lens 200. The body mount 150 can transmit and receive commands and data to and from the interchangeable lens 200 through the lens mount 250. The body mount 150 transmits various control signals received from the camera controller 140 to the lens controller 240 through the lens mount 250. The body mount 150 supplies the power from the power supply 160 to the entire interchangeable lens 200 through the lens mount 250.

1-2-2 Configuration of Interchangeable Lens

The interchangeable lens 200 includes an optical system, a lens controller 240, and a lens mount 250. The optical system includes a zoom lens 210, an OIS lens 220, a diaphragm 260 and a focus lens 230.

The zoom lens 210 is a lens for changing the magnification of a subject image formed by the optical system of the interchangeable lens 200. The zoom lens 210 is configured of one or plural pieces of lenses. A drive mechanism 211 includes a zoom ring and the like to be operated by a user and moves the zoom lens 210 along an optical axis of the optical system in accordance with a rotating operation by a user. A detector 212 detects a drive amount of the drive mechanism 211. The lens controller 240 can grasp the zoom magnification in the optical system by obtaining a detection result of the detector 212.

The OIS lens 220 is a lens for correcting blur of the subject image formed by the optical system of the interchangeable lens 200. The OIS lens 220 moves in such a direction as to cancel shake of the camera system 1 to reduce the blur of the subject image on the CCD image sensor 110. The OIS lens 220 is configured of one or plural pieces of lenses. An actuator 221 drives the OIS lens 220 in a plane perpendicular to the optical axis of the optical system under the control of an OIS IC 223. The actuator 221 can be realized by, for example, a magnet and a flat coil. A position detection sensor 222 is a sensor for detecting the position of the OIS lens 220 in the plane perpendicular to the optical axis of the optical system. The position detection sensor 222 can be realized by, for example, a magnet and a Hall element. The OIS IC 223 obtains a detection result of a camera shake sensor (not shown) such as a gyro-sensor from the lens controller 240. The OIS IC 223 controls the actuator 221 based on the detection results of the position detection sensor 222 and the camera shake sensor. Also, the OIS IC 223 transmits a signal indicating the state of an optical image blur correction process to the lens controller 240.

The diaphragm 260 is a member for regulating the amount of light passing through the optical system. The diaphragm 260 includes plural blades or the like, and can regulate the light amount by opening/closing an opening formed of the blades. A diaphragm motor 261 is a drive unit for opening/closing the opening of the diaphragm 260.

The focus lens 230 changes a focus state of the subject image formed on the CCD image sensor 110 in the optical system. The focus lens 230 is configured of one or plural lenses.

A focus motor 233 drives the focus lens 230 under the control of the lens controller 240 to go forward or backward the focus lens 230 along the optical axis of the optical system so that the focus state of the object image formed on the CCD image sensor 110 in the optical system can be changed. According to the first embodiment, the focus motor 233 is composed of a stepping motor. Nevertheless, the focus motor 233 is not limited to such a motor but may be composed of, for example, a servo motor or an ultrasonic motor.

The lens controller 240 controls operations of the OIS IC 223 and the focus motor 233 based on the control signal from the camera controller 140 to control the overall operation of the interchangeable lens 200. The lens controller 240 also receives a signal from the detector 212, the OIS IC 223, and so on, and transmits the signal to the camera controller 140. The lens controller 240 transmits and receives a signal to and from the camera controller 140 through the lens mount 250 and body mount 150.

The lens controller 240 uses a SRAM 241 as a work memory on the control operation. A flash memory 242 stores programs and parameters used for the control operation of the lens controller 240.

The lens mount 250 can be connected mechanically and electrically with the body mount 150 of the camera body 100. The lens mount 250 can transmit and receive commands and data to and from the camera body 100 through the body mount 150. The lens mount 250 transmits the several signals received from the lens controller 240 to the camera controller 140 through the body mount 150.

1-2-3 Correspondence of Technical Terms

The interchangeable lens 200 is an example of an optical system. The CCD image sensor 110 is an example of an imaging unit. The combination of the camera controller 140 and the lens controller 240 is an example of an autofocus adjusting unit.

1-3 Operation

1-3-1 Preparatory Operation for Imaging Operation

Figure 2:
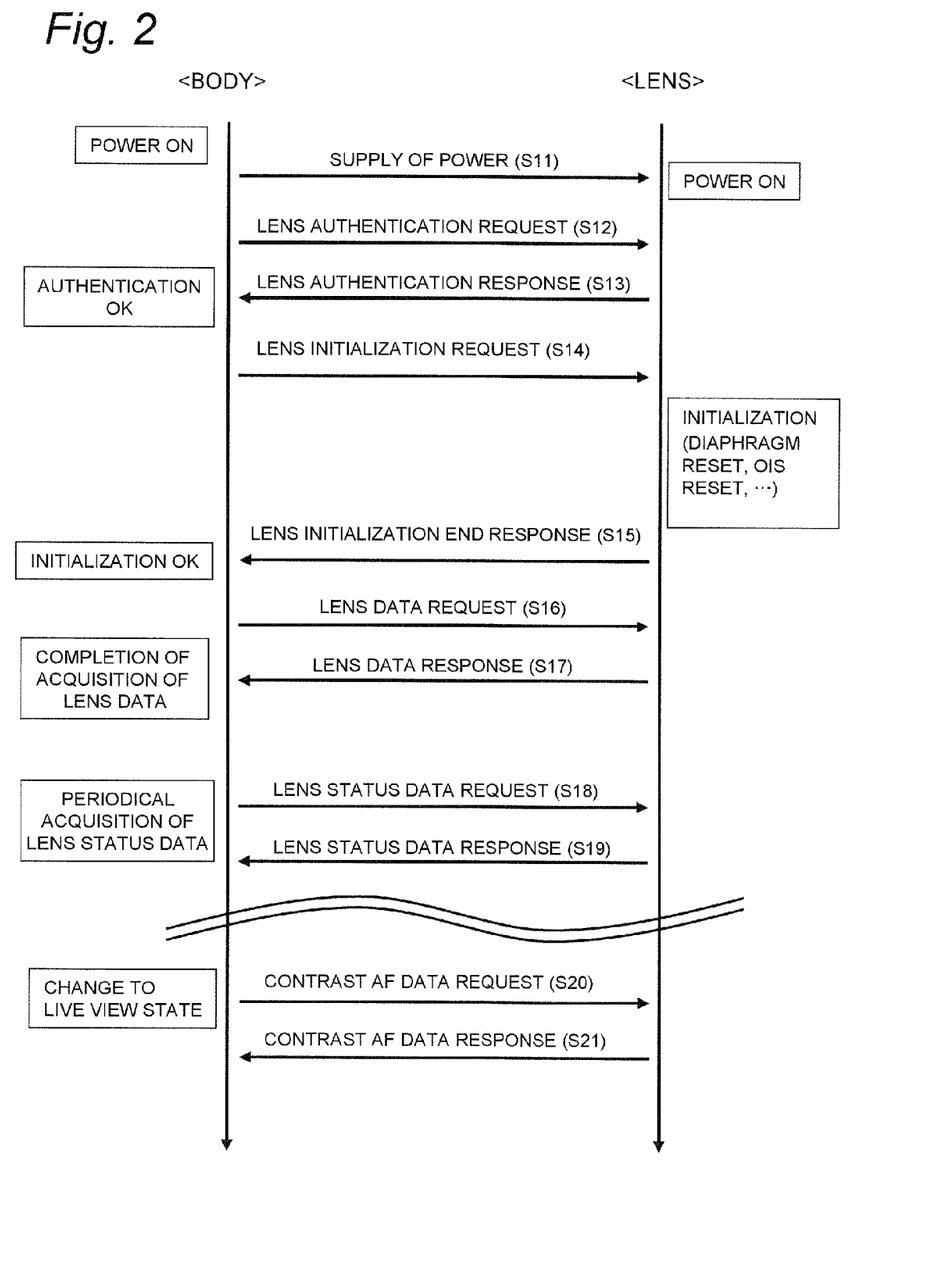
FIG. 2 is a diagram for explaining a preparatory operation for the imaging operation.

The operation of the camera system 1 in preparation for the imaging operation is explained. FIG. 2 is a diagram showing the signal transmission and reception for explaining the preparatory operation for the imaging operation of the camera system 1.

With the interchangeable lens 200 attached to the camera body 100, a user powers on the camera body 100. The power supply 160 supplies power to the interchangeable lens 200 through the body mount 150 and the lens mount 250 (S11). Next, the camera controller 140 requests the lens controller 240 to supply authentication information for the interchangeable lens 200 (S12). The authentication information for the interchangeable lens 200 includes information as to whether or not the interchangeable lens 200 is attached and information as to whether or not accessories are attached. The lens controller 240 responds to a lens authentication request from the camera controller 140 (S13).

Next, the camera controller 140 requests the lens controller 240 to perform the initializing operation (S14). In response to this request, the lens controller 240 performs the initializing operation including a reset of a diaphragm and a reset of the OIS lens 220. After that, the lens controller 240 notifies the camera controller 140 of a fact that the lens initializing operation is completed (S15).

Next, the camera controller 140 requests the lens controller 240 to supply the lens data (S16). The lens data is stored in the flash memory 242. The lens controller 240 reads the lens data from the flash memory 242, and returns it to the camera controller 140 (S17). The lens data include the characteristic values specific to the interchangeable lens 200, such as lens name, F number, and focal length.

When recognizing the lens data of the interchangeable lens 200 mounted to the camera body 100, the camera controller 140 becomes ready for the imaging operation. In this state, the camera controller 140 periodically requests the lens controller 240 to supply lens state data indicating a state of the interchangeable lens 200 (S18). The lens state data includes, for example, zoom magnification information of the zoom lens 210, position information of the focus lens 230, and diaphragm value information. In response to this request, the lens controller 240 returns the requested lens state data to the camera controller 140 (S19).

Furthermore, in this state, the camera system 1 can operate in control mode in which the image indicated by the image data generated by the CCD image sensor 110 is displayed as a through image on the LCD monitor 120. This control mode is called "a live view mode". In the live view mode, the through image is displayed as a moving image on the LCD monitor 120, and therefore, the user can determine a composition of a still picture while watching the LCD monitor 120. The user can select whether the control mode is set to the live view mode or the other mode. There is a control mode in which the image formed based on the image data generated by the CCD image sensor 110 is displayed on an electronic view finder (not shown), as the other control mode that the user can select than the live view mode. The contrast method is suitable for the live view mode. This is because in the live view mode, the image data is constantly generated by the CCD image sensor 110 and therefore the autofocus operation in contrast method can be easily performed using the generated image data.

To perform the autofocus operation in a contrast method, the camera controller 140 requests contrast AF data from the lens controller 240 (S20). The contrast AF data is data required for the autofocus operation in the contrast method, and includes at least one of focus drive speed, focus shift amount, image magnification, and information indicating whether the contrast AF operation is possible or not.

1-3-2 Contrast AF Operation

Figure 3:
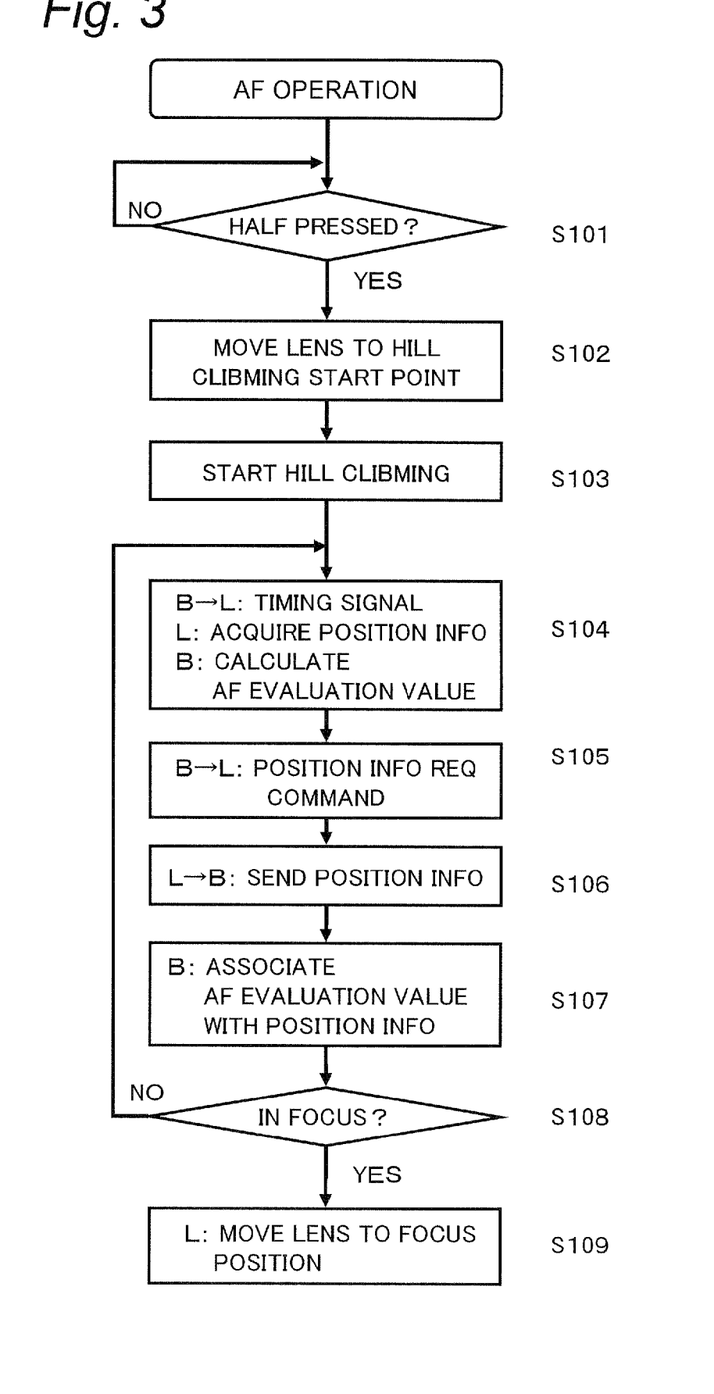
FIG. 3 is a flowchart for explaining a contrast AF operation.

The autofocus operation of the camera system 1 of which preparation for an imaging operation is complete is explained with reference to FIGS. 3 and 4. This explanation is made for an autofocus operation in the contrast method. FIG. 3 is a flowchart for explaining a basic autofocus operation, and FIG. 4 is a timing chart of an autofocus operation.

Figure 4A:
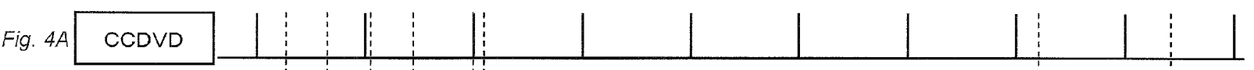
FIGS. 4A, 4B, 4C, 4D, 4E, 4F, 4G, 4H, 4J, 4K, 4L and 4M are timing charts for explaining a contrast AF operation.
Figure 4B:
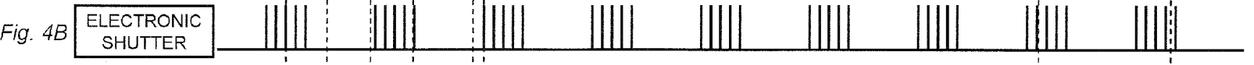
Figure 4C:
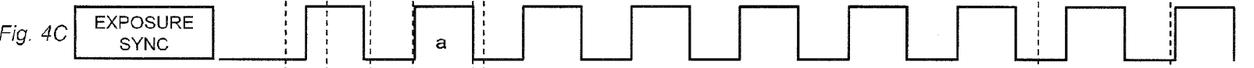

It is assumed that the camera controller 140 is operating in a live view mode. In this mode, the camera controller 140, as shown in FIG. 4A, generates a vertical synchronizing signal (CCDVD) periodically. At the same time, the camera controller 140 generates an exposure synchronizing signal based on the vertical synchronizing signal as shown in FIG. 4C. Since the camera controller 140 grasps an exposure start timing and an exposure end timing in advance based on the vertical synchronizing signal (CCDVD), the camera controller 140 can generate the exposure synchronizing signal. The camera controller 140 outputs the vertical synchronizing signal to the timing generator 112 and the exposure synchronizing signal to the lens controller 240. The lens controller 240 obtains information on a position of the focus lens 230 in synchronism with the exposure synchronizing signal. This operation is explained in detail later.

The timing generator 112 periodically generates a read signal for the CCD image sensor 110 and an electronic shutter drive signal (FIG. 4B) based on the vertical synchronizing signal. The timing generator 112 drives the CCD image sensor 110 based on the read signal and the electronic shutter drive signal.

The CCD image sensor 110 reads pixel data generated by a plurality of photoelectric conversion elements (not shown) out to a vertical transfer unit (not shown) in accordance with the read signal. According to the first embodiment, the read signal coincides with the vertical synchronizing signal, but this is not necessarily. The vertical synchronizing signal and the read signal may be shifted from each other. It is important to secure synchronization between the vertical synchronizing signal and the read signal.

Furthermore, the CCD image sensor 110 performs an electronic shutter operation in accordance with an electronic shutter drive signal. As a result, the CCD image sensor 110 can sweep out the unnecessary charge. The electronic shutter drive signal, as shown in FIG. 4B, is composed of a plurality of signals transmitted periodically within a short time. Ten signals, for example, are transmitted as one group. While one group of the electronic shutter drive signals are being transmitted, the CCD image sensor 110 performs one electronic shutter operation for each signal. By increasing the number of the signals included in each group of the electronic shutter drive signals, the charge accumulated in the CCD image sensor 110 can be positively swept out. In that case, however, the method of driving the CCD image sensor 110 is complicated.

In this way, the CCD image sensor 110 sweeps out the charge in accordance with the electronic shutter drive signal and the pixel data is read out to the vertical transfer unit (not shown) in accordance with the read signal. Therefore, the CCD image sensor 110 performs the exposure operation for the image data of the through image during a period from the last one of the electronic shutter drive signals in a group to the vertical synchronizing signal.

Figure 4D:
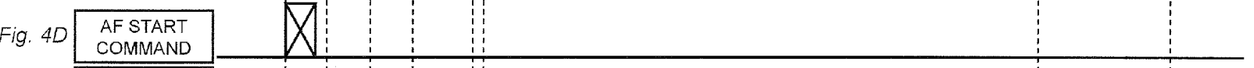

Under the condition described above, the camera controller 140 monitors whether or not the release button 130 is half-pressed (S101). In FIG. 4, it is assumed that the release button 130 is half-pressed at time t1. Then, the camera controller 140, as shown in FIG. 4D, transmits an AF start command to the lens controller 240. The AF start command is a command for starting the autofocus operation in the contrast method.

The camera controller 140, after transmitting the AF start command, transmits a move to hill climbing start point command to the lens controller 240 at time t2. The move to hill climbing start point command is a command for instructing when starting the autofocus operation in the contrast method, a position to which the focus lens 230 is to be moved and a direction in which the focus lens 230 is to be moved during the detection of the AF evaluation (contrast value). In response to this command, the lens controller 240 controls the focus motor 233. The focus motor 233 moves the focus lens 230 to the position indicated by the move to hill climbing start point command under the control of the lens controller 240 (S102).

Figure 4E:
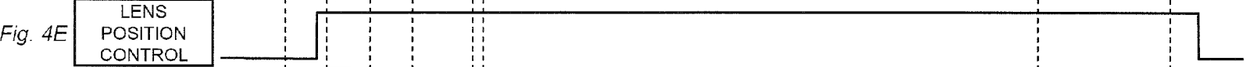
Figure 4F:
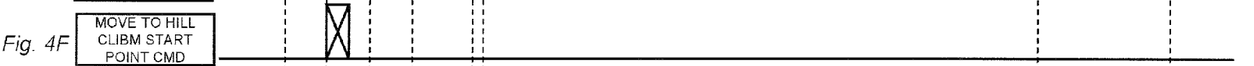
Figure 4G:
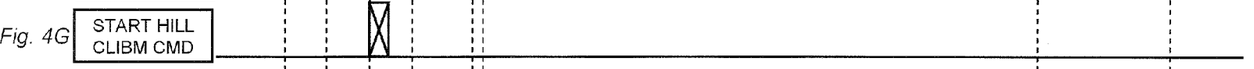
Figure 4H:
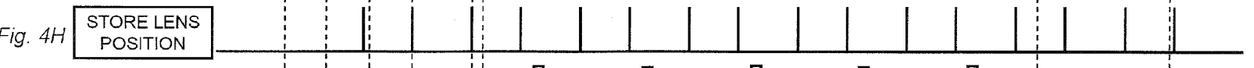

Next, the camera controller 140 transmits a hill climbing start command to the lens controller 240 at time t3 (S103). In response to the command from the camera controller 140, the lens controller 240 drives the focus lens motor 233 by a control operation as shown in FIG. 4E.

The camera controller 140, after transmitting the hill climbing start command, continues to transmit the exposure synchronizing signal to the lens controller 240 at predetermined time intervals as shown in FIG. 4C (S104).

Furthermore, the lens controller 240 stores sequentially the number of pulses of the counter 243 when the exposure synchronizing signal is turned on from off state and the number of pulses of the counter 243 when the exposure synchronizing signal is turned off from on state in a SRAM 241 (S104).

Furthermore, the CCD image sensor 110 transmits the image data exposed and generated during the exposure period to the camera controller 140 through the AD converter 111. The camera controller 140 calculates an AF evaluation (contrast value) based on the received image data (S104). Specifically, the brightness signals are determined from the image data generated by the CCD image sensor 110, and high-frequency components of the brightness signals in the image are integrated so that the AF evaluation (contrast value) is determined. The AF evaluation (contrast value) calculated in this way is stored in the SRAM 141 in correspondence with the exposure synchronizing signal.

After storing the AF evaluation (contrast value) and the exposure synchronizing signal in correspondence with each other in the SRAM 141, the camera controller 140 transmits a position information request command to request a information on a position of the lens that is stored in the SRAM 241, to the lens controller 240 (S105).

Figure 4J:
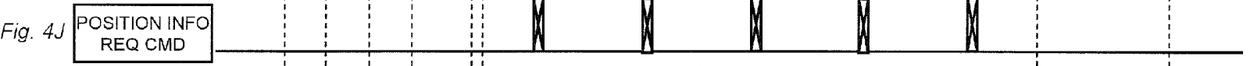

The lens controller 240, when receiving the position information request command, transmits the position information of the focus lens 230 to the camera controller 140 (S106). According to this embodiment, each time the CCD image sensor 110 captures one frame of image, the camera controller 140 sends the position information request command (FIG. 4J). Therefore, the lens controller 240, when the position information request command is obtained from the camera controller 140, sends two pieces of the lens position information stored in the SRAM 241.

Figure 4K:
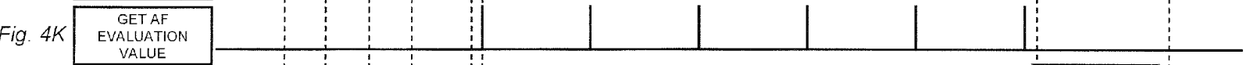

When obtaining the position information of the focus lens 230, the camera controller 140 associates the AF evaluation (contrast value) stored in the SRAM 141 with the obtained position information (S107). The associated information is stored in the SRAM 141. The AF evaluation (contrast value) and the focus lens position information are correlated with the exposure synchronizing signal. Thus, the camera controller 140 can store the AF evaluation (contrast value) in correspondence with the lens position information. For example, the AF evaluation (contrast value) calculated using the image data exposed during the period "a" in FIG. 4C is associated with the average value of positions of the focus lens 230 at time t4 and time t5 and is stored. This AF evaluation (contrast value), as shown in FIG. 4K, is stored in the SRAM 141 at time t6.

Once the AF evaluation (contrast value) and the position information of the focus lens 230 are associated with each other, the camera controller 140 judges whether or not a focus position of the focus lens is successfully extracted (S108). Specifically, the position of the focus lens 230 at which the AF evaluation (contrast value) is a local maximum value is extracted as a focus position.

In a case where the focus position of the focus lens cannot be extracted, the camera controller 140 and the lens controller 240 repeat the similar process (S104 to S108).

Figures 4L, 4M:
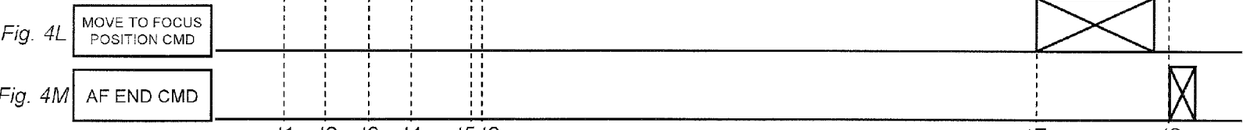

In a case where the focus position of the focus lens is successfully extracted, the camera controller 140 transmits a move to focus position command to the lens controller 240 (FIG. 4L, time t7). The move to focus position command is a command for instructing the position to which and the direction in which the focus lens 230 is to be moved. The lens controller 240 drives the focus motor 233 in accordance with the move to focus position command (S109). The camera controller 140, when completing movement to the focus position, transmits an AF completion command to the lens controller 240 (FIG. 4M, time t8). In this way, the autofocus operation in the contrast method is completed.

According to this embodiment, the method of driving the focus lens 230 in determination of the AF evaluation (contrast value) is different in accordance with whether or not the zoom operation is performed and/or how the camera system 1 is moved. This is described in detail below.

Figure 5:
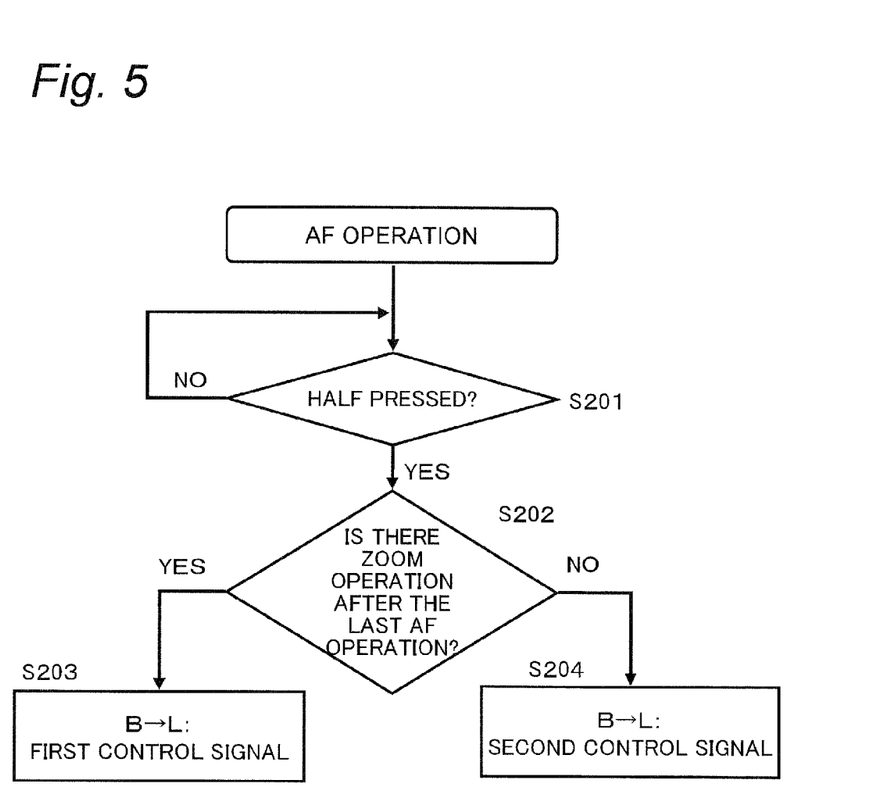
FIG. 5 is a flowchart for explaining a contrast AF operation switched based on whether or not a zoom operation is performed.
Figure 6:
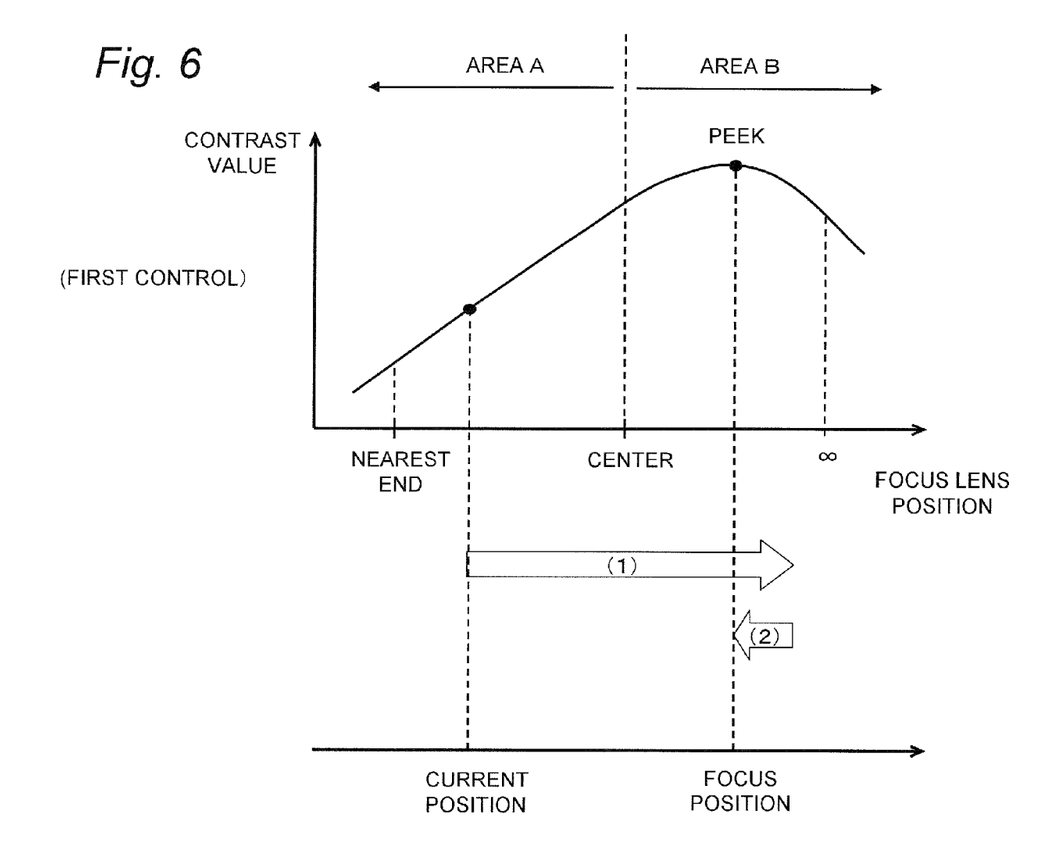
FIG. 6 is a diagram for explaining a control operation with a first control signal.
Figure 7:
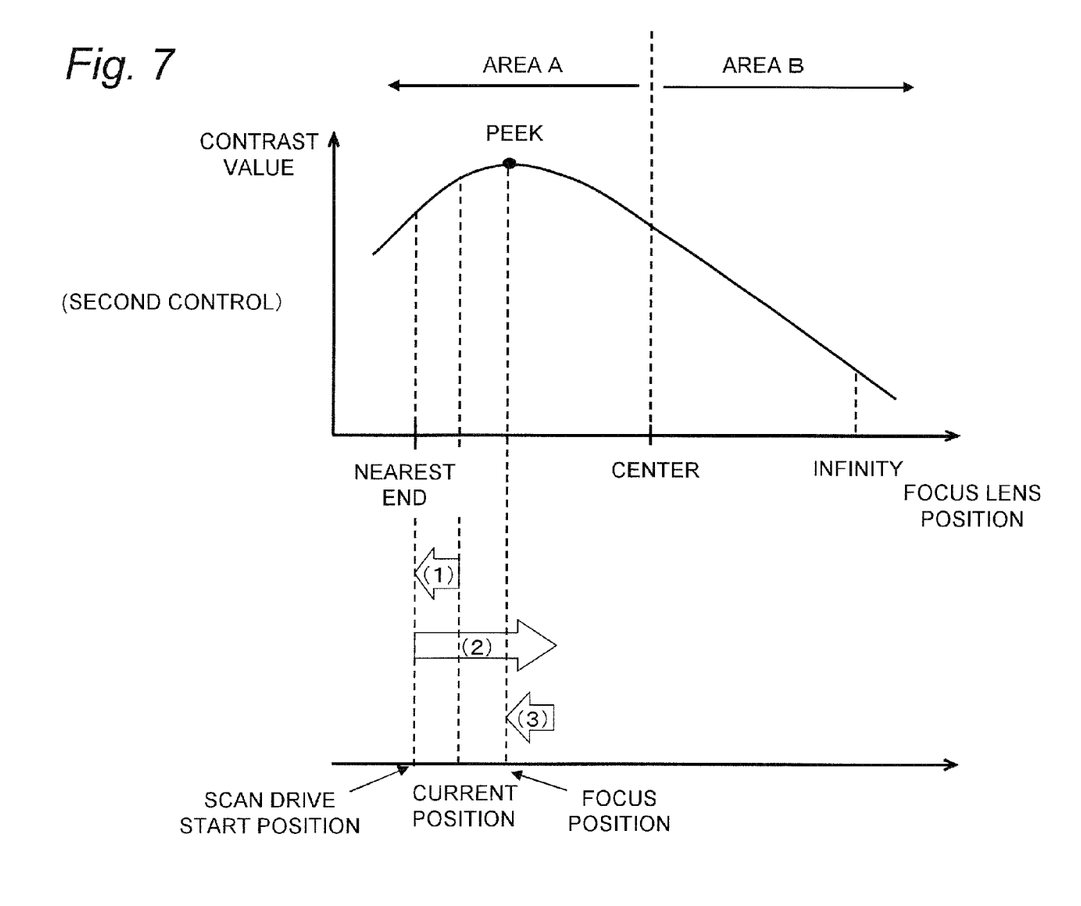
FIG. 7 is a diagram for explaining a control operation with a second control signal.

1-3-3 Switching Contrast AF Operation in Accordance with Whether or not Zoom Operation is Performed The difference of the contrast AF operation according to whether or not the zoom operation is performed is explained with reference to FIGS. 5 to 7. FIG. 5 is a flowchart for explaining the contrast AF operation. FIG. 6 is a schematic diagram for explaining a first control operation in the contrast AF mode. FIG. 7 is a schematic diagram for explaining a second control operation in the contrast AF mode.

Referring to FIG. 5, once the shooting mode is set, the camera controller 140 monitors whether or not the user half presses the release button 130 (S201). When judging that the release button 130 is half pressed, the camera controller 140 judges whether or not the zoom lens 210 is driven after the last autofocus control operation is done (S202). When judging that the zoom lens 210 is driven after the last focus control operation, the camera controller 140 transmits a first control signal for instructing the lens controller 240 to perform a first control operation (S203). On the other hand, when judging that the zoom lens 210 is not driven after the last focus control operation, the camera controller 140 transmits a second control signal for instructing the lens controller 240 to perform a second control operation (S204). Hereinbelow, the operations based on the first and second control signals are explained.

First, the control operation based on the first control signal is explained with reference to FIG. 6. When obtaining the first control signal, the lens controller 240 controls the focus motor 233 to drive the focus lens 230 as shown in FIG. 6.

Specifically, the area where the focus lens 230 can exist is divided into two areas (areas A and B) with a center of an infinity and a nearest end. In this case, according to the area in which the focus lens 230 exists, a driving direction of the focus lens 230 is changed. In a case where the focus lens 230 exists in the area A on a nearest end side as shown in FIG. 6, for example, the focus motor 233 moves the focus lens 230 at a high speed (first speed) toward an infinitely far area B (scan drive, arrow (1)). When a peak of the AF evaluation (contrast value) is detected, the focus motor 233 moves the focus lens 230 to the focus position (move, arrow (2)). On the other hand, in a case where the focus lens 230 exists in the area B on the infinity side before an autofocus control operation, the focus motor 233 moves the focus lens 230 toward the nearest end side area A. In short, when starting the autofocus control operation, the focus motor 233 moves the focus lens 230 toward an area other than an area where the focus lens 230 exists. The reason why this control operation is performed is described below.

The camera controller 140 transmits the first control signal to the lens controller 240 in a case where the zoom operation is performed after the last autofocus control operation. Once the zoom operation is performed, the focus position changes greatly from the current focus position. In such a case, it is estimated that the focus position is largely changed. Therefore, the peak of the AF evaluation value (contrast value) can be detected with a higher probability at a higher speed by moving the focus lens 230 to a position distant from the current position and checking the AF evaluation (contrast value) there than by checking a periphery of the present position of the focus lens 230. Thus, when it can be estimated that the focus position is changed largely due to the zoom operation, the lens controller 240 drives the focus lens 230 in a direction toward the area other than the area in which the focus lens 230 exists currently to search for the focus position. In that case it can be estimated that moving distance of the focus lens 230 is long. Therefore, the focus lens 230 is driven at a higher speed (first speed) so that the focus operation can be performed more quickly.

Next, a control operation based on the second control signal is explained with reference to FIG. 7. When obtaining the second control signal, the lens controller 24 controls the focus motor 233 to drive the focus lens 230 as shown in FIG. 7. Specifically, in the case where the focus lens 230 exists in the nearest end side area A, the focus motor 233 drives the focus lens 230 somewhat toward the nearest end (move, arrow (1)). After that, the focus motor 233 drives the focus lens 230 toward an infinity at a second speed lower than the first speed (scan drive, arrow (2)). As a result, the peak of the AF evaluation (contrast value) is detected. When the peak of the AF evaluation (contrast value) is detected, the focus motor 233 moves the focus lens 230 to the focus position (move, arrow (3)). On the other hand, in a case where the focus lens 230 exists in the infinity side area B, the lens controller 240 moves the focus lens 230 toward the infinity (moved). After that, the lens controller 240 drives the focus lens 230 toward the nearest side area A at the second speed (scan drive) to detect the peak of the AF evaluation (contrast value). When the peak of the AF evaluation (contrast value) is detected, the lens controller 240 moves the focus lens 230 to the focus position (move). The reason why this control operation is performed is described below.

The camera controller 140 sends the second control signal to the lens controller 240 in a case where the zoom operation is not performed after the last autofocus control operation. In this case, there is high possibility that the focus position is not changed, and the focus position is often located near the current position of the focus lens 230. That is, it is estimated that a change in the focus position is small. Therefore, in this case, the peak of the AF evaluation (contrast value) can possibly be detected at high speed by searching the periphery of the current position of the focus lens 230. Therefore, when it can be estimated that the change in the focus position due to the zoom operation is small, the lens controller 240 moves the focus lens 230 somewhat toward an end of the area where the focus lens 230 exists at present (in a direction to the nearest end for the area A, or in a direction to the infinity for the area B), and then moves the focus lens 230 in the opposite direction to search for the focus position. As a result, the focus operation can be accurately performed at high speed. During such operation, the focus lens 230 is driven at the second speed slower than the first speed to prevent the focus lens 230 from passing through the focus position. As a result, the autofocus operation at a high speed with high accuracy can be achieved. The reason why once the focus lens 230 is moved somewhat toward the end of the area (arrow (1)) at the start of the driving the focus lens 230 is to keep the focus lens 230 away from the position near the focus position and then start the hill climbing drive. As a result, the focus lens 230 is moved (c) surely toward the focus position of the focus lens 230.

As described above, the camera system 1 according to this embodiment, when receiving the autofocus command from the user, controls the drive of the focus lens differently according to whether or not the zoom operation is performed after the previous autofocus control operation. As a result, the camera system 1 can search for the peak of the AF evaluation (contrast value) efficiently, thereby making it possible to speed up the autofocus control operation in the contrast method.

1-3-4 Switching the Contrast AF Operation Based on the Motion of the Camera System The difference between the AF operation of the camera system 1 according to this embodiment based on the motion thereof detected by a motion detector such as a gyro sensor and the basic AF operation shown in FIG. 3 is explained below with reference to FIG. 8.

Figure 8:
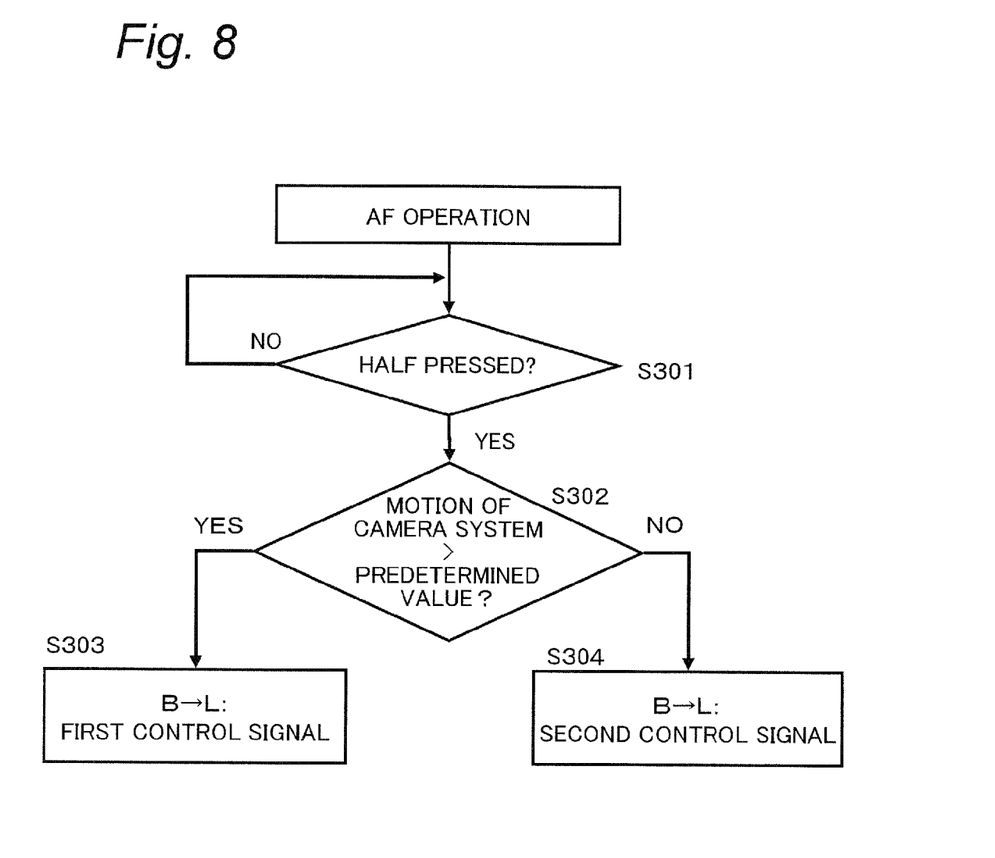
FIG. 8 is a flowchart for explaining the contrast AF operation switched based on a magnitude of motion of the camera system.

Referring to FIG. 8, when the system is set in the live view mode, the camera controller 140 monitors whether or not the release button 130 is half-pressed by the user (S301). When judging that that the release button 130 is half-pressed, the camera controller 140 obtains a magnitude of a motion of the camera system 1 (or the camera body 100) detected by the motion detector such as the gyro sensor from the lens controller 240 and compares it with a predetermined value (S302). The camera controller 140, when judging that the magnitude of the motion of the camera system 1 detected by the motion detector such as the gyro sensor is larger than the predetermined value, transmits the first control signal to the lens controller 240 (S303). On the other hand, when judging that the magnitude of the motion of the camera system 1 detected by the motion detector such as the gyro sensor is smaller than the predetermined value, the camera controller 140 transmits the second control signal to the lens controller 240 (S304). Hereinbelow, the operations based on the first and second control signals are explained.

First, the operation based on the first control signal is explained with reference to FIG. 6. Upon obtaining the first control signal, the lens controller 24 drives the focus lens 230 as shown in FIG. 6. Specifically, the lens controller 240 changes a driving direction according to whether the focus lens 230 exists in the area A or the area B. For example, when the focus lens 230 exists in the area A on the nearest end side as shown in FIG. 6, the lens controller 240 drives the focus lens 230 at a high speed (first speed) toward the area B on the infinity side (scan drive, arrow (1)). Then, when detecting a peak of the AF evaluation (contrast value), the lens controller 240 moves the focus lens 230 to the focus position (move, arrow (2)).

On the other hand, in a case where the focus lens 230 exists in the area B on the infinity side, the lens controller 240 drives the focus lens 230 at a high speed (first speed) toward the area A on the nearest end side (scan drive). When detecting the peak of the contrast value, the lens controller 240 moves the focus lens 230 toward to the focus position (move). In short, the lens controller 240 drives the focus lens 230 at a high speed toward an area opposite to an area where the focus lens 230 exists (scan drive). The reason why this control operation is performed is explained below.

The camera controller 140 sends the first control signal to the lens controller 240 in a case where the magnitude of the motion of the camera system 1 detected by the motion detector such as the gyro sensor is larger than a predetermined value. In the case where the magnitude of the motion of the camera system 1 is larger than the predetermined value, the focus position is changed greatly from the current focus position. In such a case, the focus position is estimated to change greatly. In this case, the peak of the contrast value can be detected with higher probability by checking the contrast value at a position distant from the present position than by checking the periphery of the present position of the focus lens 230. Therefore, when it can be estimated that the focus position is changed greatly based on the detected motion, the lens controller 240 drives the focus lens 230 at a high speed (first speed) in a direction opposite to an area where the focus lens 230 is located (scan drive) thereby to search for the focus position. In this way, the focus operation can be performed at a high speed. Furthermore, since the focus lens 230 is driven at a high speed, the change in the focusing state due to the drive of the focus lens 230 can be made less conspicuous on the through image displayed on the LCD monitor 120.

Next, the second control signal is explained with reference to FIG. 7. The lens controller 240, when obtaining the second control signal, drives the focus lens 230 as shown in FIG. 7. Specifically, in a case where the focus lens 230 is located in the area A on the nearest end side, the lens controller 240 moves the focus lens 230 toward the nearest end (move, arrow (1)). After that, the lens controller 240 drives the focus lens 230 toward the area B on the infinity side at the second speed lower than the first speed (scan drive, arrow (2)), thereby detecting the peak of the AF evaluation (contrast value). The lens controller 240, when detecting the peak of the AF evaluation (contrast value), moves the focus lens 230 to the focus position (move, arrow (3)). On the other hand, in a case where the focus lens 230 is located in the area B on the infinity side, the lens controller 240 moves the focus lens 230 toward the infinity (move). After that, the lens controller 240 drives (scan drive) the focus lens 230 toward the area A on the nearest end side at a lower speed (second speed) thereby to detect the peak of the AF evaluation (contrast value). The lens controller 240, when detecting the peak of the AF evaluation (contrast value), moves the focus lens 230 to the focus position (move). The reason why this control operation is performed is described below.

The camera controller 140 sends the second control signal to the lens controller 240 in a case where the magnitude of the motion of the camera system 1 detected by the motion detector such as the gyro sensor is smaller than a predetermined value. In such a case, the focus position may not be changed greatly, and it may be often near from the present position of the focus lens 230. That is, it is estimated that a change in the focus position is small. In this case, for searching for the focus position, the peak of the contrast value can probably be detected at a high speed by searching the periphery of the present position of the focus lens 230. Thus, the lens controller 240, when judging that the change in the focus position is small based on the detected motion, searches for the focus position by moving the focus lens 230 toward the end of the area in which the focus lens 230 exists and then driving it at a low speed in the opposite direction (scan drive). As a result, the focus operation can be performed accurately and hence quickly.

As described above, the camera system 1 according to this embodiment operates in such a manner that when receiving an autofocus operation command from the user, the focus lens 230 is driven differently according to whether the motion of the camera system 1 detected by the motion detector such as the gyro sensor is larger or smaller than a predetermined magnitude. Especially, in a case where the motion of the camera system 1 detected by the motion detector such as the gyro sensor is larger than the predetermined magnitude, the scan drive operation is performed at a higher speed. On the other hand, in a case where the motion of the camera system 1 detected by the motion detector such as the gyro sensor is smaller than the predetermined magnitude, the scan drive operation is performed at a lower speed. Furthermore, the focus lens 230 is driven in a different direction in accordance with the magnitude of the motion of the camera system 1. With this arrangement, the camera system 1 can search for the focus position at a high speed.

1-3-4-1 First Modification Using Object Motion Detection Based on Captured Image In the camera system 1 described above, the motion of the camera system 1 is detected by the motion detector such as the gyro sensor. Nevertheless, the motion may alternatively be detected based on the image data that is generated by the CCD image sensor 110. In such a case, the camera controller 140 includes a circuit for detecting the motion vector of the object by a known method from plural image data generated by the CCD image sensor 110. This method is specifically described below.

The camera controller 140 compares the size of the motion vector of the object (or the magnitude of the motion of the object calculated based on the size of the motion vector of the object) with a predetermined value. When judging that the size of the motion vector of the object (or the magnitude of the motion of the object calculated based on the size of the motion vector of the object) is larger than the predetermined value, the camera controller 140 sends the first control signal to the lens controller 240. On the other hand, when judging that the size of the motion vector of the object (or the magnitude of the motion of the object calculated based on the size of the motion vector of the object) is smaller than the predetermined value, the camera controller 140 sends the second control signal to the lens controller 240. The lens controller 240 that has received the first or second control signal drives the focus lens 230 according to a driving method similar to the one described above.

Incidentally, the camera controller 140 may be configured to compare both the magnitude of the motion of the camera system 1 and the size of the motion vector of the object or the magnitude of the motion of the object calculated based on the size of the motion vector of the object are each compared with respective predetermined values. In a first example of this configuration, when judging that one of the magnitude of the motion of the camera system 1 and the size of the motion vector of the object or a magnitude of a motion of the object calculated based on a size of the motion vector of the object is larger than the predetermined value, the camera controller 140 sends the first control signal to the lens controller 240. On the other hand, when judging that both the magnitude of the motion of the camera system 1 and the size of the motion vector of the object or the magnitude of the motion of the object calculated based on the size of the motion vector of the object are smaller than the respective predetermined values, the camera controller 140 sends the second control signal to the lens controller 240. In a second example of the configuration, when judging that both the magnitude of the motion of the camera system 1 and the size of the motion vector of the object or the magnitude of the motion of the object calculated based on the size of the motion vector of the object are larger than respective predetermined values, the camera controller 140 sends the first control signal to the lens controller 240. On the other hand, when judging that one of the magnitude of the motion of the camera system 1 and the size of the motion vector of the object or the magnitude of the motion of the object calculated based on the size of the motion vector of the object is smaller than the respective predetermined value, the camera controller 140 sends the second control signal to the lens controller 240.

1-3-4-2 Second Modification Using Object Motion Detection Based on Captured Image Another example using the object motion detection based on the captured image is explained. The camera controller 140 may include a circuit for detecting a predetermined color area, for example, a skin color area, according to a known method from the image data generated by the CCD image sensor 110. The camera controller 140 detects the skin color area each time the image data is generated by the CCD image sensor 110, and therefore it can obtain a magnitude of a motion of the skin color area.

In this case, the camera controller 140 compares the magnitude of the motion of the skin color area (or the magnitude of the object motion calculated based on the magnitude of the motion of the skin color area) with a predetermined value. When judging that the magnitude of the motion of the skin color area (or the magnitude of the object motion calculated based on the magnitude of the motion of the skin color area) is larger than the predetermined value, the camera controller 140 sends the first control signal to the lens controller 240. On the other hand, when judging that the magnitude of the motion of the skin color area (or the magnitude of the object motion calculated based on the magnitude of the motion of the skin color area) is smaller than the predetermined value, the camera controller 140 sends the second control signal to the lens controller 240. The lens controller 240 that has obtained the first or second control signal drives the focus lens 230 according to a driving method similar to the aforementioned method.

1-3-4-3 Third Modification Using Object Motion Detection Based on Captured Image Still another example using the object motion detection based on the captured image is explained. The camera controller 140 may include a circuit for detecting a predetermined face area of a human being according to a known method from the image data generated by the CCD image sensor 110. The camera controller 140 detects the face area of the human being each time the image data is generated by the CCD image sensor 110, and therefore it can obtain a magnitude of a motion of the face area of the human being.

In this case, the camera controller 140 compares the magnitude of the motion of the face area of the human being (or the magnitude of the motion of the object calculated based on the magnitude of the motion of the face area of the human being) with a predetermined value. When judging that the magnitude of the motion of the face area of the human being (or the magnitude of the motion of the object calculated based on the magnitude of the motion of the face area of the human being) is larger than the predetermined value, the camera controller 140 sends the first control signal to the lens controller 240. On the other hand, when judging that the magnitude of the motion of the face area of the human being (or the magnitude of the motion of the object calculated based on the magnitude of the motion of the face area of the human being) is smaller than the predetermined value, the camera controller 140 sends the second control signal to the lens controller 240. The lens controller 240 that has obtained the first or second control signal drives the focus lens 230 according to a driving method similar to the aforementioned method.

1-3-5 AF Mode

As AF (autofocus) mode, there are so-called a single AF mode in which the focus lens 230 is stopped at the focus position when completing the autofocus operation, and so-called a continuous AF mode in which the focus lens 230 is continuously driven. The embodiment described above presupposes the single AF mode. However the technical concept of the aforementioned focus lens drive method is applicable also to the continuous AF mode, which obtains a similar effect.

In a case where the lens controller 240 receives the first control signal in a single AF mode, the focus lens 230 moves the focus lens 230 to the focus position after the scan drive at the first speed (high speed). In a case where the lens controller 240 receives the second control signal, the lens controller 240 moves the focus lens 230 to the scan drive start position, then performs the scan drive at the second speed (low speed) and then moves the focus lens 230 to the focus position.

In continuous AF mode, the scan drive is continued without moving the focus lens 230 to the scan drive start position or the focus position. Specifically, even in a case where the focus position is detected, the scan drive is continued toward the focus position. The lens controller 240, when obtaining the first control signal, performs the scan drive at the first speed (high speed), and when obtaining the second control signal, performs the scan drive at the second speed (low speed).

1-4 Summary of this Embodiment

In the camera system 1 according to this embodiment, as described above, the focus lens is driven by different driving methods in the AF operation according to whether or not the zoom operation is performed or based on the magnitude of the motion of the camera system (or the subject). Specifically, the autofocus operation is performed in the following manner. That is, the focus position is estimated in accordance with the state of the camera system (whether or not the zoom operation is performed, and the magnitude of motion of the camera system and/or the subject), when it is estimated that focus position is changed considerably, the focus lens is moved at a high speed and/or greatly, on the other hand, when it is estimated that the focus position is changed to a degree so small, the focus lens is moved at a low speed and/or to a small degree. In this way, the autofocus operation with high speed and better accuracy is realized.

Specifically, the camera system 1 according to this embodiment includes the optical system having the focus lens 230 capable of changing the zoom magnification, the CCD image sensor 110 for generating the image data by capturing the subject image formed by the optical system, the focus motor 233 for driving the focus lens 230 in the direction along the optical axis of the optical system, and the camera controller 140 for controlling the focus motor 233 to drive the focus lens 230 while evaluating the image data generated by the CCD image sensor 110 so that the subject image formed on the CCD image sensor 110 is adjusted to comes into focus. When adjusting the subject image to be in focus anew after previously adjusting the subject image to be in focus, the camera controller 140 estimates the focus position and controls the focus motor 233 such that the driving method of the focus lens 230 for evaluating the image data generated by the CCD image sensor 110 is different depending on the estimation result.

With this arrangement, the camera system 1 can search for the peak of the AF evaluation (contrast value) efficiently. Thus, the autofocus control operation in the contrast method can be sped up.

2. Other Embodiments

The first embodiment is explained above. However, the embodiment is not limited to the first embodiment. Other embodiments are explained below.

In the camera system 1 according to the aforementioned embodiment, the focus lens is driven in different ways in accordance with whether or not the zoom operation is performed after the focus operation. The invention, however, is not necessarily limited to this method. For example, the focus lens may be driven differently according to whether or not the pan operation is performed after the focus operation. Specifically, in a case where the pan operation is not performed after the focus operation, the focus lens is driven by a small distance in one direction and then is driven in the opposite direction to search for the peak of the AF evaluation (contrast value). On the contrary, in a case where the pan operation is performed after the focus operation, the focus lens is driven in one direction and then driven in the other direction to search for the peak of the AF evaluation (contrast value). This is because when the pan operation is performed, the focus position of the focus lens is possibly changed to a position distant from the present position.

Furthermore, immediately after the camera system 1 is powered on or when the focus operation fails upon the previous half-pressing of the release button 130, the focus lens 230 is possibly not in a vicinity of the focus position. In such a case, it may be configured that the autofocus control operation in the contrast method is performed according to the aforementioned first control method.

Further, according to the first embodiment, both the driving direction and the driving speed of the focus lens 230 are different between the control operations based on the first and second control signals. Nevertheless, either one of the driving direction and the driving speed of the focus lens 230 may be different between the control operations based on the first and second control signals.

In the first embodiment described above, the camera body has no movable mirror. However, the configuration is not limited to such a configuration, and the camera body may include a movable mirror or a prism for separating the subject image. Alternatively, the movable mirror may be arranged not in the camera body but in an adaptor. Further, the camera system described above includes not only a camera system having a camera body and an interchangeable lens but also a camera system in which a camera body and a lens are integrated.

Furthermore, according to the first embodiment, the CCD image sensor 110 is used as an imaging element. Nevertheless, the invention is not limited to such a configuration, and alternatively, the imaging element may be a CMOS image sensor or a NMOS image sensor.

INDUSTRIAL APPLICABILITY

The embodiment is applicable to an imaging apparatus such as a digital still camera and a digital video camera

What is claimed is:

1. An imaging apparatus comprising:
an optical system including a focus lens;
an imaging unit operable to capture a subject image formed by the optical system to generate image data;
a driver operable to drive the focus lens along an optical axis of the optical system; and
an autofocus adjusting unit operable to adjust a subject image formed on the imaging unit to be in focus by evaluating the image data generated by the imaging unit and by controlling the driver to drive the focus lens; wherein
when adjusting the subject image to be in focus anew after previously adjusting the subject image to be in focus, the autofocus adjusting unit detects whether or not a zoom magnification of the optical system is changed during a period from the previous focus operation to the new focus operation, and controls the driver to drive the focus lens according to a driving method used for evaluating the image data generated by the imaging unit, and wherein
different driving methods are used between when the zoom magnification is changed and when the zoom magnification is not changed;
the autofocus adjusting unit drives the focus lens in one direction when the zoom magnification of the optical system is changed, and
the autofocus adjusting unit drives the focus lens in one direction and, after the driving in the one direction, drives the focus lens in another direction opposite to the one direction when the zoom magnification of the optical system is not changed.

2. The imaging apparatus according to claim 1, wherein the autofocus adjusting unit generates a first control signal when the zoom magnification of the optical system is changed and generates a second control signal when the zoom magnification of the optical system is not changed, and
the first control signal is a signal for driving the focus lens at a first speed, and the second control signal is a signal for driving the focus lens at a second speed lower than the first speed.

3. An imaging apparatus comprising:
an optical system including a focus lens;
an imaging unit operable to capture a subject image formed by the optical system to generate image data;
a driver operable to drive the focus lens along an optical axis of the optical system; and
an autofocus adjusting unit operable to adjust a subject image formed on the imaging unit to be in focus by evaluating the image data generated by the imaging unit and by controlling the driver to drive the focus lens; wherein
when adjusting the subject image to be in focus anew after previously adjusting the subject image to be in focus, the autofocus adjusting unit detects whether or not a zoom magnification of the optical system is changed during a period from the previous focus operation to the new focus operation and controls the driver to drive the focus lens according to a driving method among different driving methods used for evaluating the image data generated by the imaging unit according to the results of the detection, the driving methods including a driving method for driving the focus lens at a first speed, and a driving method for driving the focus lens at a second speed lower than the first speed, and wherein the autofocus adjusting unit drives the focus lens at the first speed when the zoom magnification of the optical system is changed, and drives the focus lens at the second speed when the zoom magnification of the optical system is not changed.

* * * * *